(12) United States Patent
Filko

(10) Patent No.: US 11,944,139 B2
(45) Date of Patent: Apr. 2, 2024

(54) PROTECTIVE SHIELD FOR INDIVIDUAL RESPIRATORS AND FACE MASKS

(71) Applicant: Jeremy Scott Filko, Vienna, VA (US)

(72) Inventor: Jeremy Scott Filko, Vienna, VA (US)

(*) Notice: Subject to any disclaimer, the term of this patent is extended or adjusted under 35 U.S.C. 154(b) by 262 days.

(21) Appl. No.: 17/214,207

(22) Filed: Mar. 26, 2021

(65) Prior Publication Data

US 2021/0298389 A1 Sep. 30, 2021

Related U.S. Application Data

(60) Provisional application No. 63/000,751, filed on Mar. 27, 2020.

(51) Int. Cl.
*A41D 13/11* (2006.01)
*A62B 23/02* (2006.01)
*B33Y 80/00* (2015.01)

(52) U.S. Cl.
CPC ........ *A41D 13/1184* (2013.01); *A62B 23/025* (2013.01); *B33Y 80/00* (2014.12)

(58) Field of Classification Search
CPC ............... A41D 13/11; A41D 13/1184; A41D 13/1161; A41D 13/1138; A41D 13/1146; A41D 31/10; A41D 13/05; A62B 23/025; A62B 23/02; A62B 18/025; B33Y 80/00; A45D 44/12
USPC .......... 2/9, 424, 206, 200.2, 200.3; 128/857, 128/888, 889, 206.21
See application file for complete search history.

(56) References Cited

U.S. PATENT DOCUMENTS

| | | | | |
|---|---|---|---|---|
| 2,762,368 A | * | 9/1956 | Bloomfield | A61F 9/029 D24/110.2 |
| 2,795,796 A | * | 6/1957 | Ray | A41G 7/00 2/202 |
| 2,881,443 A | * | 4/1959 | Barker, Jr. | A61F 9/025 2/9 |
| 3,261,027 A | * | 7/1966 | Lambert | A45D 44/12 128/857 |
| 3,295,511 A | * | 1/1967 | Crouzet | A62B 18/045 2/205 |
| 3,736,928 A | * | 6/1973 | Andersson | A41D 13/113 128/206.19 |
| 4,027,340 A | * | 6/1977 | Hadtke | A41G 7/00 2/206 |

(Continued)

*Primary Examiner* — Heather Mangine
*Assistant Examiner* — Raquel M. Weis
(74) *Attorney, Agent, or Firm* — Carter, DeLuca & Farrell LLP

(57) ABSTRACT

A protective shield configured to be disposed over an N95 respirator worn by a user includes piece of material defining a body, a flap, and a living hinge interconnecting the body and the flap. The flap is foldable relative to the body about the living hinge to fold under the chin with the body extending across the face. The body includes a center portion, from which the flap depends, and first and second wings extending laterally outwardly in opposite directions from the center portion. The body further includes a protruding portion extending vertically from an upper end of the center portion of the body opposite of and in vertical alignment with the living hinge. The protruding portion defines a V-shaped cut-out to facilitate bending of the body about a centerline of the center portion to enable conformance of the body about an N95 respirator and a user's nose.

8 Claims, 5 Drawing Sheets

(56) References Cited

U.S. PATENT DOCUMENTS

| | | | | |
|---|---|---|---|---|
| 4,250,577 A * | 2/1981 | Smith | A62B 18/084 | 2/427 |
| 4,825,878 A * | 5/1989 | Kuntz | A61F 9/02 | 2/9 |
| 4,852,186 A * | 8/1989 | Landis | A61F 9/02 | 2/9 |
| 4,872,465 A * | 10/1989 | Kuntz | A41D 13/1184 | 2/9 |
| 4,920,576 A * | 5/1990 | Landis | A41D 13/1184 | 2/9 |
| 4,945,573 A * | 8/1990 | Landis | A41D 13/1184 | 351/158 |
| 4,945,574 A * | 8/1990 | Dagher | A41D 13/1184 | 128/201.12 |
| 4,969,213 A * | 11/1990 | Gruneisen, III | A61F 9/045 | 2/206 |
| 5,099,525 A * | 3/1992 | Millauro | A61F 9/029 | 128/857 |
| 5,107,543 A * | 4/1992 | Hansen | A41D 13/1184 | 2/427 |
| D326,932 S * | 6/1992 | Millar | A41D 13/1184 | 128/201.15 |
| 5,129,103 A * | 7/1992 | Gruneisen | A42B 1/208 | 2/206 |
| 5,214,800 A * | 6/1993 | Braun | A42B 1/208 | 2/205 |
| 5,303,423 A * | 4/1994 | Gazzara | A61F 9/02 | 128/857 |
| 5,337,419 A * | 8/1994 | Russell | A61F 9/02 | 128/857 |
| 5,406,944 A * | 4/1995 | Gazzara | A62B 18/082 | 128/201.12 |
| 5,446,925 A * | 9/1995 | Baker | A61F 9/02 | 2/9 |
| 5,584,078 A * | 12/1996 | Saboory | A41D 13/1184 | 2/427 |
| 5,682,606 A * | 11/1997 | Pospisil | A41D 13/11 | 2/9 |
| 5,682,879 A * | 11/1997 | Bowers | A62B 18/082 | 128/201.12 |
| 5,720,281 A * | 2/1998 | Allen | A62B 18/084 | 128/205.25 |
| 5,956,760 A * | 9/1999 | Wine | G02C 11/00 | 2/9 |
| 6,012,164 A * | 1/2000 | Deal, III | A63B 71/10 | 2/9 |
| 6,026,511 A * | 2/2000 | Baumann | A61F 9/029 | 2/9 |
| 6,055,982 A * | 5/2000 | Brunson | A41D 13/1176 | 128/206.25 |
| 6,213,125 B1 * | 4/2001 | Reese | A41D 13/1184 | 2/9 |
| 6,694,971 B2 * | 2/2004 | Schroeder | A62B 23/025 | 128/201.14 |
| 6,988,500 B1 * | 1/2006 | Cox | A41D 13/1146 | 128/201.15 |
| 7,540,039 B2 * | 6/2009 | Reaux | A41D 13/1184 | 128/201.15 |
| 9,032,554 B2 * | 5/2015 | Lucier | A42B 1/0192 | 2/9 |
| 10,980,297 B1 * | 4/2021 | Augustine | A62B 7/10 | |
| 2003/0145858 A1 * | 8/2003 | Cardarelli | A61F 9/045 | 128/206.22 |
| 2005/0251890 A1 * | 11/2005 | Landis | A41D 13/1184 | 2/9 |
| 2008/0271737 A1 * | 11/2008 | Facer | A41D 13/11 | 128/205.25 |
| 2009/0126064 A1 * | 5/2009 | Reaux | A41D 13/1161 | 2/9 |
| 2010/0126504 A1 * | 5/2010 | Johnstone | A61F 9/029 | 128/202.13 |
| 2010/0218774 A1 * | 9/2010 | Flaherty | A41D 13/1138 | 29/428 |
| 2012/0167891 A1 * | 7/2012 | Smaller | A62B 18/025 | 128/206.28 |
| 2014/0109918 A1 * | 4/2014 | Nabai | A61B 90/05 | 128/858 |
| 2014/0202469 A1 * | 7/2014 | Smaller | A62B 18/084 | 128/863 |
| 2015/0352382 A1 * | 12/2015 | Jayaraman | A62B 18/02 | 128/206.13 |
| 2016/0324228 A1 * | 11/2016 | Ito | A41D 13/1161 | |
| 2016/0353815 A1 * | 12/2016 | Nabai | A61B 90/05 | |
| 2017/0007861 A1 * | 1/2017 | Parham | A62B 18/025 | |
| 2017/0157435 A1 * | 6/2017 | Choi | A41D 1/005 | |
| 2017/0209308 A1 * | 7/2017 | Kakinuma | A61F 9/029 | |
| 2017/0258150 A1 * | 9/2017 | Abdulqader | A41D 13/113 | |
| 2018/0343938 A1 * | 12/2018 | Koros | A41D 31/145 | |
| 2021/0298389 A1 * | 9/2021 | Filko | A62B 23/025 | |

* cited by examiner

PROTECTIVE SHIELD FOR INDIVIDUAL RESPIRATORS AND FACE MASKS

CROSS-REFERENCE TO RELATED APPLICATIONS

This application claims the benefit of U.S. Provisional Patent Application No. 63/000,751, filed on Mar. 27, 2020, the entire contents of which are hereby incorporated herein by reference.

BACKGROUND

Technical Field

The present disclosure relates to personal protective equipment, e.g., for healthcare workers, and, more specifically, to a protective shield for individual respirators and face masks.

Background of Related Art

Face masks and N95 respirators are examples of personal protective equipment that are used to protect the wearer from airborne particles and liquid contaminating the nose and mouth.

A face mask is a loose-fitting, disposable device that creates a physical barrier between the mouth and nose of the wearer and potential contaminants in the immediate environment. Face masks are made in different thicknesses and with different ability to protect from contact with liquids. These properties may also affect how easily the wearer can breathe through the mask and how well the face mask protects the wearer. If worn properly, a face mask is meant to help block large-particle droplets, splashes, sprays, or splatter that may contain germs (viruses and bacteria), keeping it from reaching the mouth and nose. Face masks may also help reduce exposure of the wearer's saliva and respiratory secretions to others. While a face mask may be effective in blocking splashes and large-particle droplets, a face mask, by design, does not filter or block very small particles in the air that may be transmitted by coughs, sneezes, or certain medical procedures. Face masks also do not provide complete protection from germs and other contaminants because of the loose fit between the surface of the face mask and the wearer's face. Most face masks are not intended to be used more than once.

An N95 respirator is a respiratory protective device designed to achieve a very close facial fit and very efficient filtration of airborne particles. The "N95" designation means that when subjected to careful testing, the respirator blocks at least 95 percent of very small (0.3 micron) test particles. If properly fitted, the filtration capabilities of N95 respirators generally exceed those of face masks. However, even a properly fitted N95 respirator does not completely eliminate the risk of illness or death. Most if not all N95 respirators are intended for single use.

Outside of the healthcare field, face masks and N95 respirators are used in industrial jobs, e.g., construction sites, factories, etc., and other situations that that may expose the wearer to dust, fluids, and/or small particles. These non-medical face masks and N95 respirators are also typically designated as single-use devices.

SUMMARY

N95 respirators and face masks provide a level of protection for the wearer; however, as most are constructed for single-use, their effectiveness and, thus, the protection provided, may diminish when used repeatedly or for extended periods of time. When there is sufficient supply, used N95 respirators and face masks can simply be discarded in favor of new ones. However, if supply is limited, N95 respirators and face masks may need to be reused or worn for extended periods of time.

The present disclosure provides a protective shield that increases the effectiveness of N95 respirators and face masks and/or helps maintain the effectiveness of reused or prolongly-used N95 respirators and face masks. The protective shield of the present disclosure is: lightweight (e.g., less than 10 grams); configured to rest with minimal contact over an N95 respirator (or face mask); provides some stand-off if a face mask is worn on top of the protective shield; allows air-flow through the N95 respirator, allowing it to perform its filtering functions with no or minimal efficiency reductions; allows heat to dissipate therethrough and away from the wearer; wraps around and under, but does not sit flush against a substantial portion of or directly attach to the N95 respirator (or face mask); may attach to the retention system of the N95 respirator (or face mask) or include its own retention system; reduces the amount or prevents particles, debris, liquids, etc. from contaminating the N95 respirator (or face mask); does not impact the seal between the N95 respirator and the wearer; and is durable and capable of being cleaned and disinfected for repeated use.

BRIEF DESCRIPTION OF THE DRAWINGS

Various aspects and features of the present disclosure are described herein with reference to the drawings wherein like reference numerals identified similar or identical elements.

DETAILED DESCRIPTION

Figure 1:
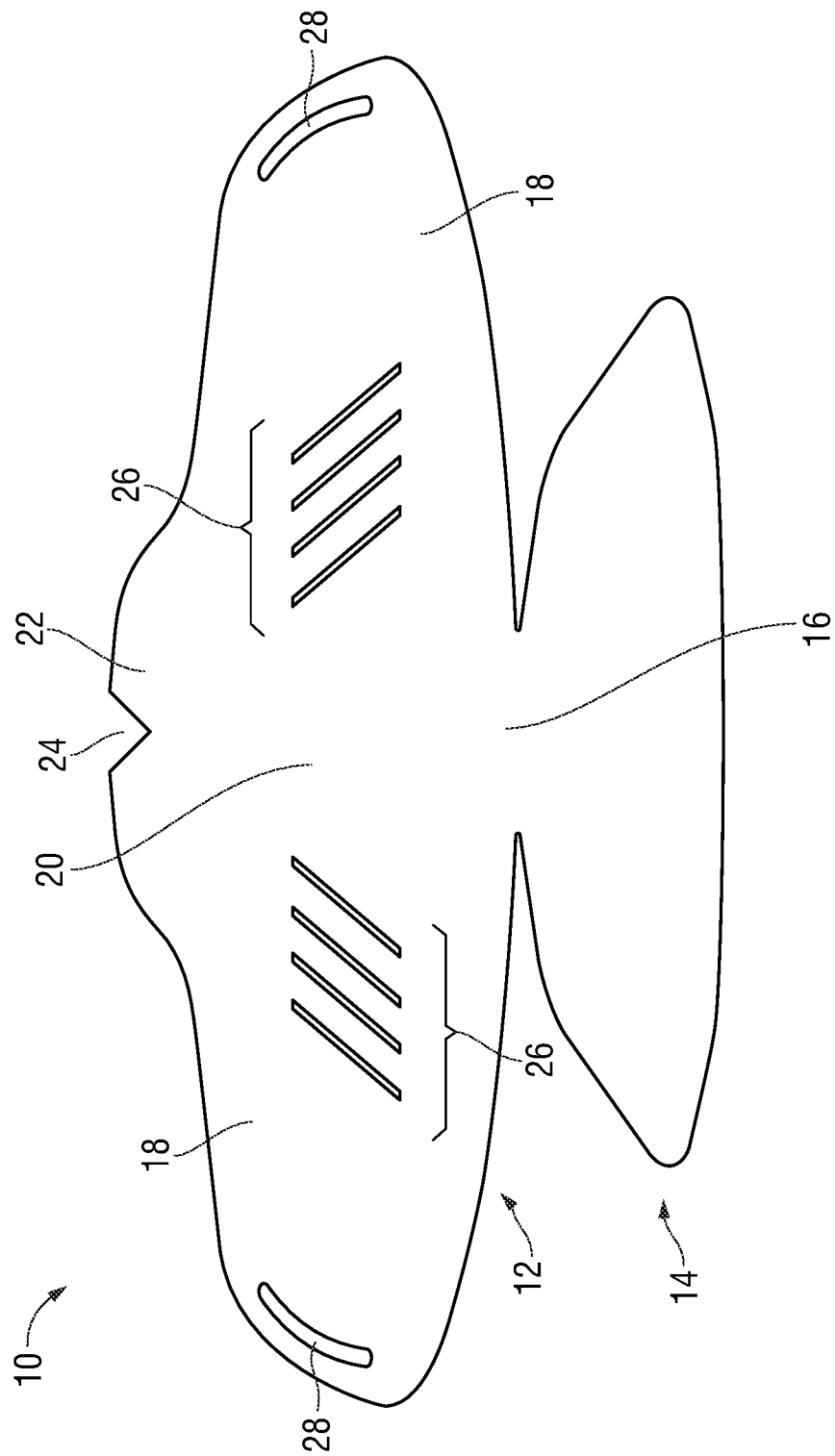
FIG. 1 is a top view of a protective shield provided in accordance with the present disclosure.
Figure 2A:
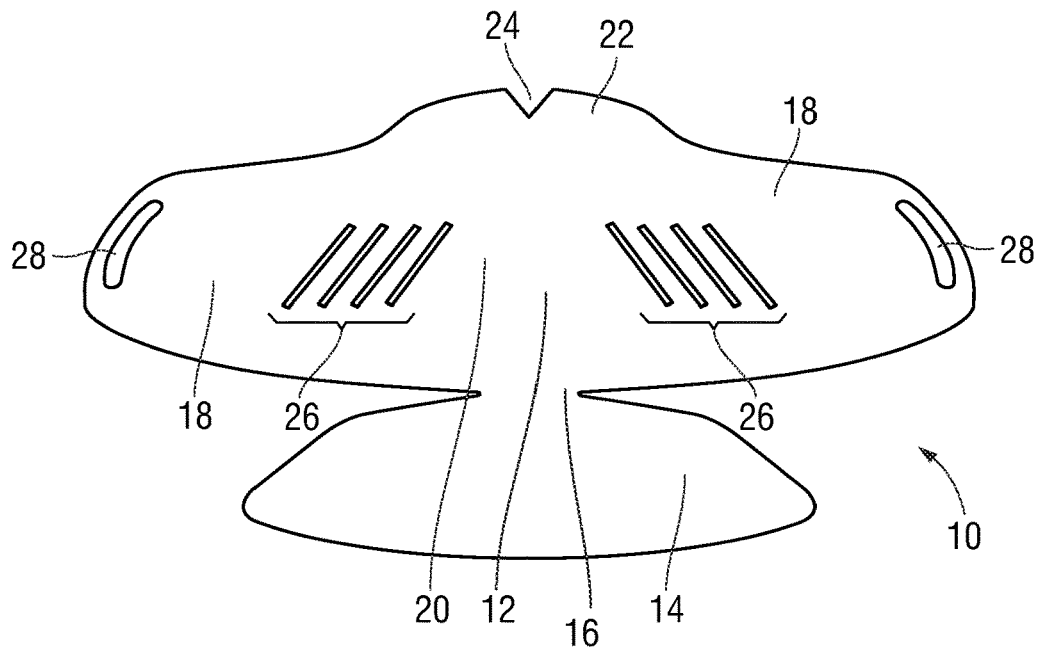
FIGS. 2A and 2B are top and bottom views, respectively, of the protective shield of FIG. 1.
Figure 2B:
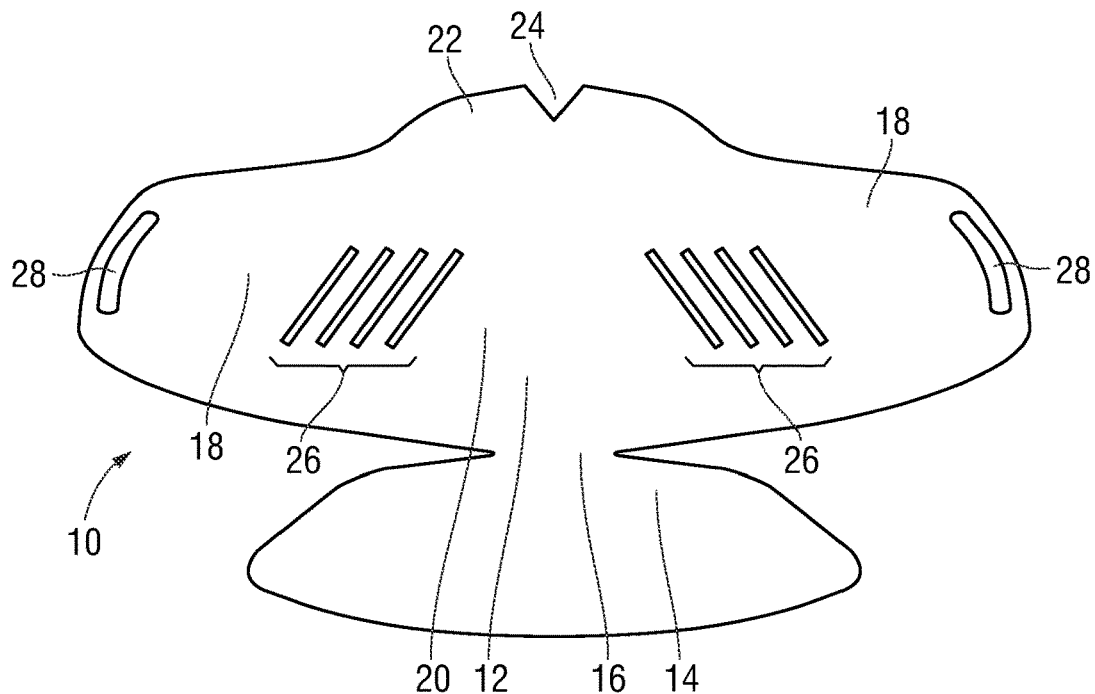

Turning to FIGS. 1-2B and 5, a protective shield provided in accordance with the present disclosure is shown generally identified by reference numeral 10. Protective shield 10 is configured for positioning about an N95 respirator to cover a substantial portion thereof, e.g., at least 70% of the outer surface area thereof, at least 80% of the outer surface area thereof, or at least at least 90% of the outer surface area thereof, without substantially contacting the N95 respirator, e.g., contacting less than 30% of the outer surface area thereof, contacting less than 20% of the outer surface area thereof, or contacting less than 10% of the outer surface area thereof, and without substantially inhibiting performance of the N95 respirator. Although detailed herein for use with an N95 respirator, protective shield 10 is also configured for use with a face mask or other suitable personal protective equipment.

Protective shield 10 is formed from any suitable biocompatible, low porosity, polymeric material including, for example, acrylonitrile butadiene styrene (ABS), polytetrafluoroethylene (PTFE), rubber, etc. Protective shield 10 is flexible to facilitate manipulation thereof, while sufficiently rigid to maintain structural integrity when worn over an N95 respirator with minimal contact therebetween. Protective shield 10 is configured for repeated use and is readily cleanable (including disinfectant and sanitization cleaning) between each use. Protective shield 10 may be made from three-dimensional (3D) printing, injection molding, or by any other suitable manufacturing process.

Continuing with reference to FIGS. 1-2B and 5, protective shield 10 includes a body 12 and a lower flap 14 depending from a lower end of body 12 and connected thereto via a straight of material defining a living hinge 16. Body 12 of protective shield 10 includes a pair of wings 18 extending outwardly in opposite directions from a center portion 20 of body 12. A protruding portion 22 extends from an upper end of center portion 20 of body 12 opposite and in general vertical alignment with living hinge 16. A "V"-shaped cutout 24 is defined within protruding portion 22 to facilitate bending of protective shield 10 about a centerline of center portion 20, e.g., to enable general conformance about an N95 respirator and a wearer's nose (see FIG. 5).

Figure 3:
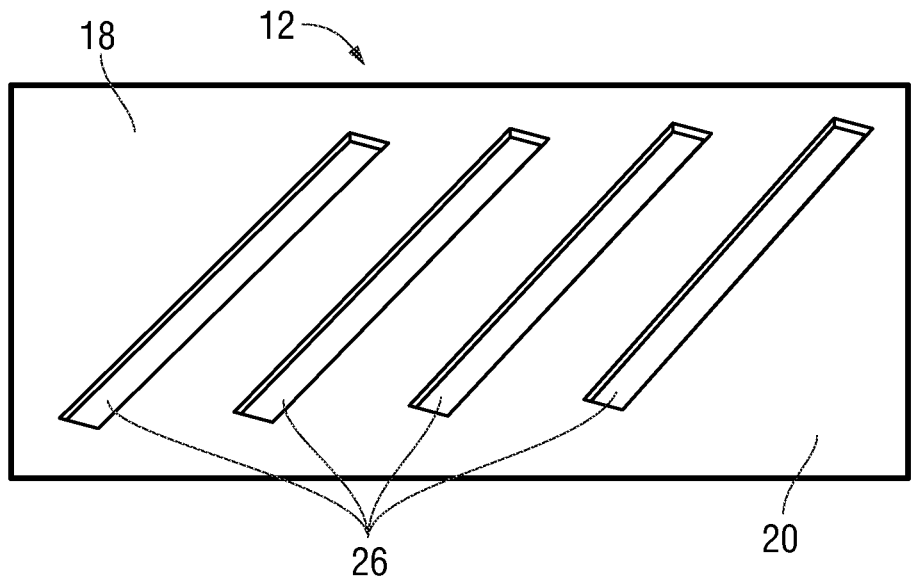
FIG. 3 is an enlarged, perspective view of another portion of the protective shield of FIG. 1 illustrating vent slots thereof.
Figure 4:
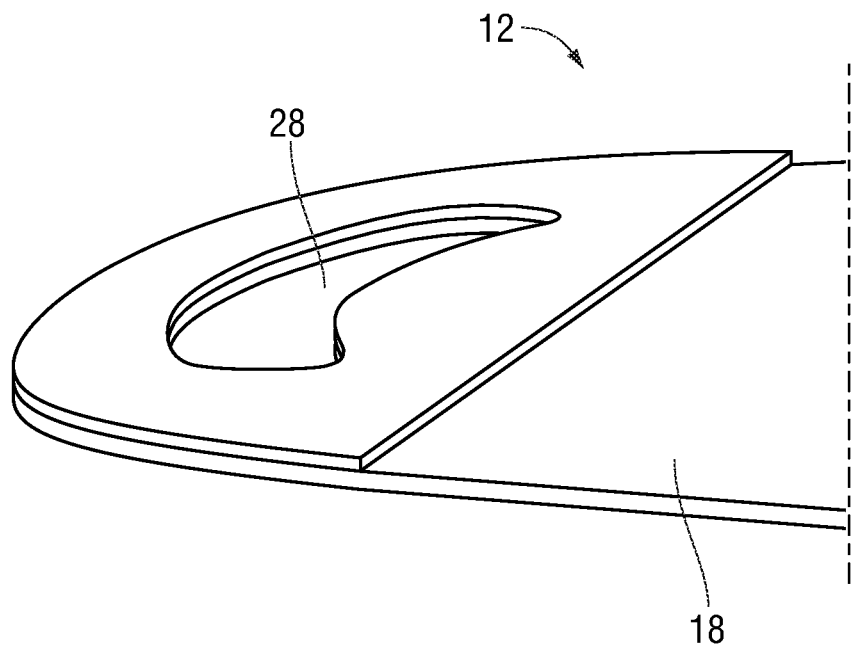
FIG. 4 is an enlarged, perspective view of a portion of the protective shield of FIG. 1, illustrating a wing end and attachment loop thereof.

Referring also to FIG. 3, a plurality of vent slots 26 are defined through body 12 on either side of the centerline of center portion 20. More specifically, the plurality of vent slot 26 on each side include equally-spaced, substantially parallel slots angling inwardly in a lower end to upper end direction. The pluralities of vent slots 26 are disposed on the outer portions of center portion 20 and/or the inner portions of wings 18 such that, in use, the vent slots 26 are disposed on opposing sides of a wearer's mouth (see FIG. 5). As an alternative to or in addition to vent slots 26, vent apertures (not explicitly shown), or other suitable vent structures are also contemplated. For example, the size, shape, number, and/or location of vent slots 26 may be modified based upon the particular use of protective shield 10, e.g., whether configured for use with an N95 respirator, face mask, or other protective device.

With reference to FIGS. 1-2B, 4, and 5, wings 18 extend outwardly from center portion 20 of body 12 and each defines an arcuate, crescent-shaped, or other suitable attachment loop 28 at the free end thereof. Attachment loops 28 enable attachment of an elastic band or other suitable tie of attachment structure for securing protective shield 10 to a user, e.g., around a user's head, around a user's ears, etc., or to an attachment structure of an N95 respirator (see FIG. 5). Outer portions of wings 18, e.g., the outer 30% thereof, the outer 40% thereof, or the outer 50% thereof, are reinforced with additional material and/or additional layers of material such that the outer portions of wings 18 define an increased thickness, e.g., an at least 50% greater thickness, an at least 75% greater thickness, or an at least 100% greater thickness, as compared to center portion 20 and the remainder of wings 18 (and, in embodiments, the remainder of protective shield 10).

Figure 5:
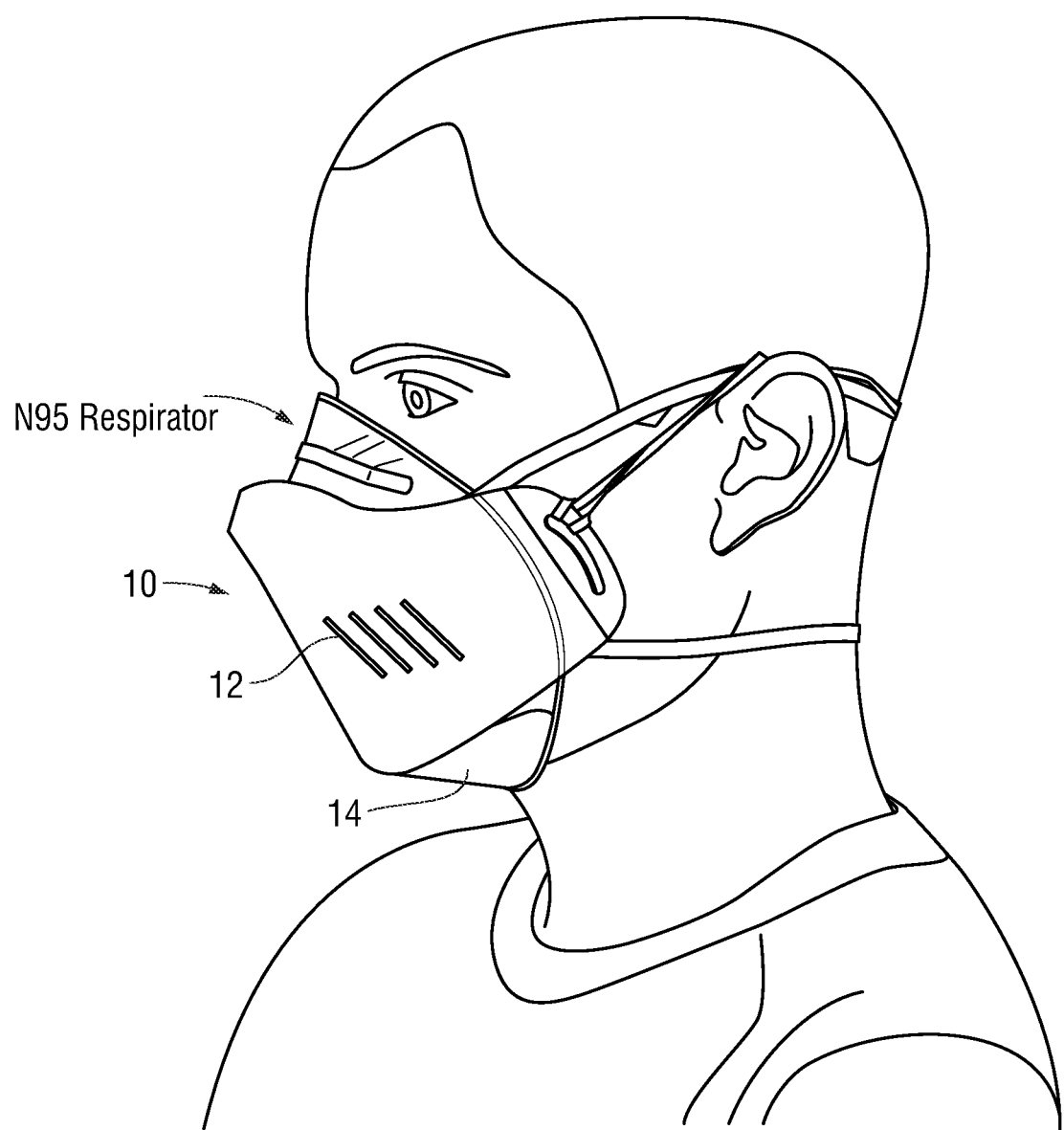
FIG. 5 is a perspective view of the protective shield of FIG. 1 disposed over an N95 respirator, worn on the face of a wearer.
Figure 6:
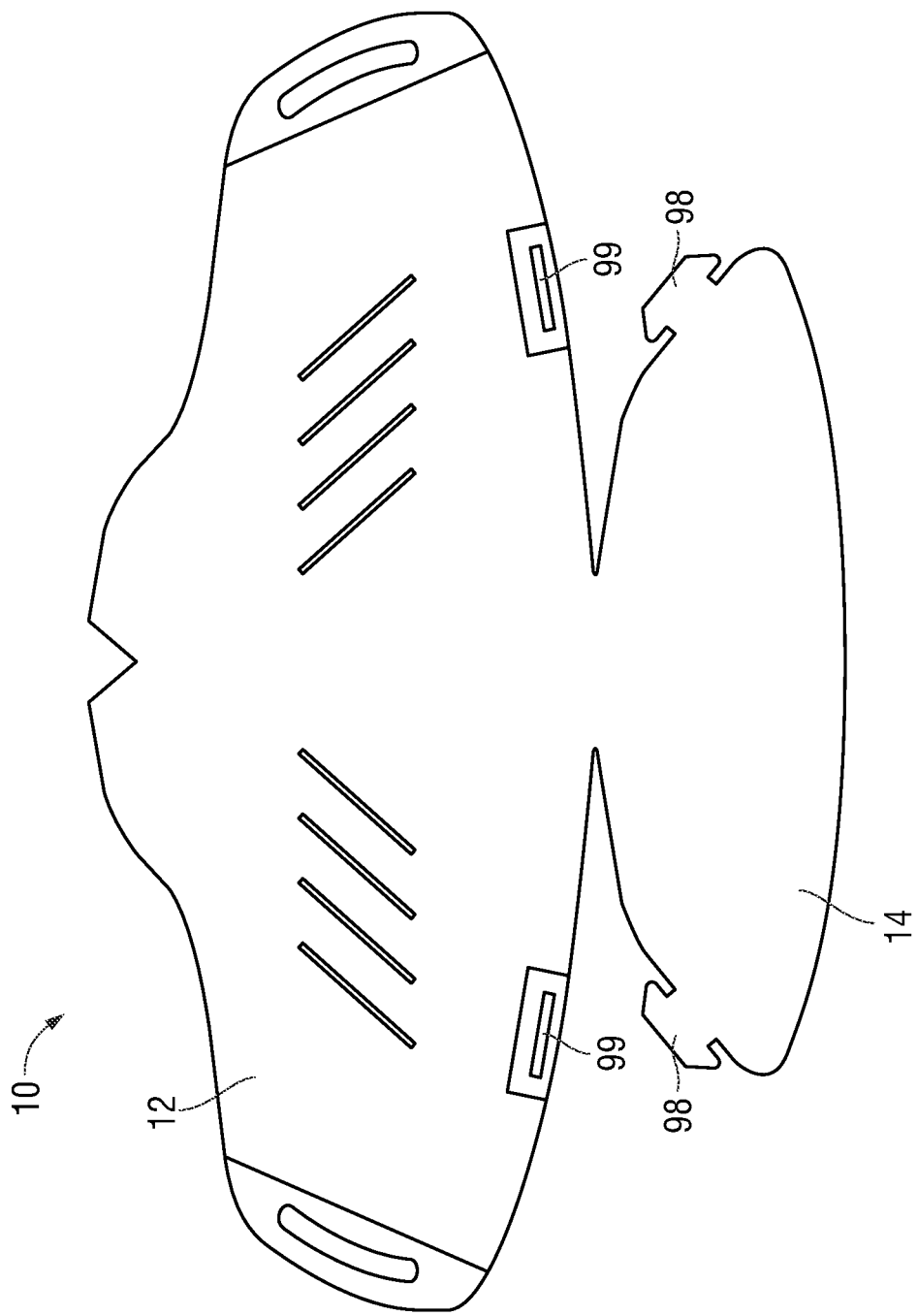
FIG. 6 is a top view of another protective shield provided in accordance with the present disclosure.

Referring again to FIGS. 1-2B and 5, lower flap 14 of protective shield 10 defines a generally trapezoidal-shaped configuration wherein the shorter side thereof is connected to body 12 by way of living hinge 16. As a result of this configuration, lower flap 14 may be folded under a wearer's chin to protect the underside of the N95 respirator (see FIG. 5). Referring momentarily to FIG. 6, in some embodiments, lower flap 14 includes dovetails 100 configured for receipt within corresponding slots 200 defined within body 12 to secure lower flap 14 in an angled orientation relative to body 12, e.g., underneath a wearer's chin, wherein lower flap 14 is disposed at an internal angle of at most 120 degrees, at most 110 degrees, or at most 100 degrees, relative to body 12. Alternatively, as illustrated in FIG. 5, the dovetails and slots may be omitted and lower flap 14 held in the angled orientation via retention of the lower edge thereof against a lip of the N95 respirator. Further, in other configurations, lower flap 14 is held in the angled orientation via retention features associated with the N95 respirator or via the stiffness of protective shield 10 and/or configuration of living hinge 16.

With reference to FIG. 5, in use, protective shield 10 serves as a first line of defense to collect or deflect particles, debris, liquids, etc. such that a significant amount of particles, debris, liquids, etc. do not reach and, thus, do not contaminate the N95 respirator (or face mask), thus facilitating reuse or extended use thereof. Further, the spacing between protective shield 10 and the N95 respirator (or face mask), due to the fact that there is minimal contact and not attachment therebetween, allows the N95 respirator (or face mask) to operate with little or no reduction in efficiency or breathing ability and also allows for heat transfer away from the wearer's face. After use, the protective shield 10 can be washed with water and soap, sanitizer, disinfectant, or other suitable solution, then rinsed and dried in preparation for reuse.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A protective system, comprising:
an N95 respirator configured to be worn on a face of a user over a mouth and nose of the user; and
a protective shield removably positionable about the N95 respirator on the face of the user, the protective shield including:
a piece of material, the piece of material being flexible, unreactive to living tissue, and polymeric; the piece of material defining a body, a flap, and a living hinge; the body including a center portion having a first side and a second side, an upper edge extending laterally between the first side and the second side at an upper end of the center portion of the body, and a lower edge opposite the upper edge and extending laterally between the first side and the second side at a lower end of the center portion of the body; the living hinge connecting the lower edge of the center portion of the body and the flap with one another; wherein the flap is configured to fold relative to the body about the living hinge such that the flap is foldable over a bottom end of the N95 respirator and under a chin of the user while the center portion of the body extends across the N95 respirator and across the face of the user,
wherein the body includes a first wing and a second wing extending laterally outwardly in opposite directions from the respective first and second sides of the center portion, the first wing and the second wing defining a first attachment slot and a second attachment slot, respectively, each of the first and second attachment slots configured for receipt of a tie of an attachment structure for securing the body relative to the N95 respirator and the face of the user, and wherein the center portion of the body further includes a protruding portion extending vertically from the upper end of the center portion of the body opposite of and in vertical alignment with the living hinge, the protruding portion defining a portion of the upper edge and centered between and in a spaced relation relative to the first side and the second side of the center portion of the body, the protruding portion including a V-shaped cut-out defined within the portion of the upper edge of the center portion of the body to define a vertical bend axis extending vertically between the upper edge and the lower edge of the center portion of the body to facilitate bending of the body about the vertical bend axis to enable conformance of the body about the N95 respirator and the nose of the user when the protective shield is disposed over the N95 respirator worn by the user, and wherein the flap, in a folded position relative to the body, is configured to releasably engage the body at a first position and a second position spaced-apart from and disposed on opposite sides of the living hinge, the flap including a first dovetail connector and a second dovetail connector and the body including a first engagement slots and a second engagement slot, the first dovetail connector and the second dovetail connector configured to releasably engage the first engagement slot and the second engagement slot at the first position and the second position, respectively, to releasably engage the flap with the body at the first position and the second position.

2. The protective system according to claim 1, wherein the first wing and the second wing of the body are reinforced via an increased thickness at the first wing and the second wing as compared to the center portion.

3. The protective system according to claim 2, further comprising at least one additional layer of material disposed on the piece of material at the first wing and the second wing of the body to define the increased thickness.

4. The protective system according to claim 1, wherein a first plurality and a second plurality of ventilation slots are defined through the center portion of the body.

5. The protective system according to claim 1, wherein the piece of material is formed from at least one of: acrylonitrile butadiene styrene (ABS), polytetrafluoroethylene (PTFE), and rubber.

6. The protective system according to claim 1, wherein the piece of material is 3D printed.

7. The protective system according to claim 1, wherein, with the protective shield positioned about the N95 respirator on the face of the user, the protective shield is configured to cover at least 70% of an outer surface area of the N95 respirator.

8. The protective system according to claim 7, wherein, with the protective shield positioned about the N95 respirator on the face of the user, the protective shield is further configured to contact less than 30% of the outer surface area of the N95 respirator.

* * * * *